Patented Aug. 30, 1938

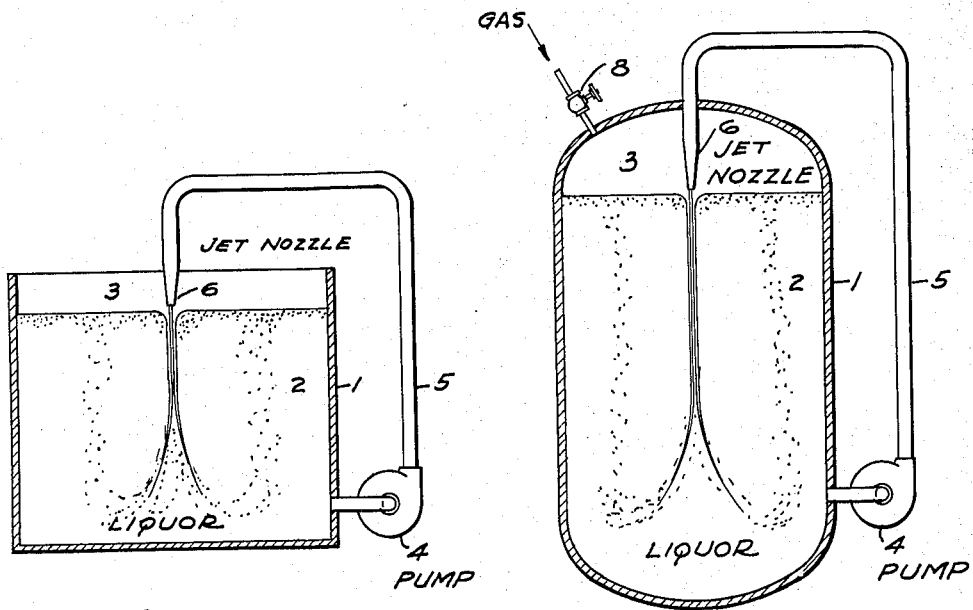
Fig. 1.
Fig. 2.
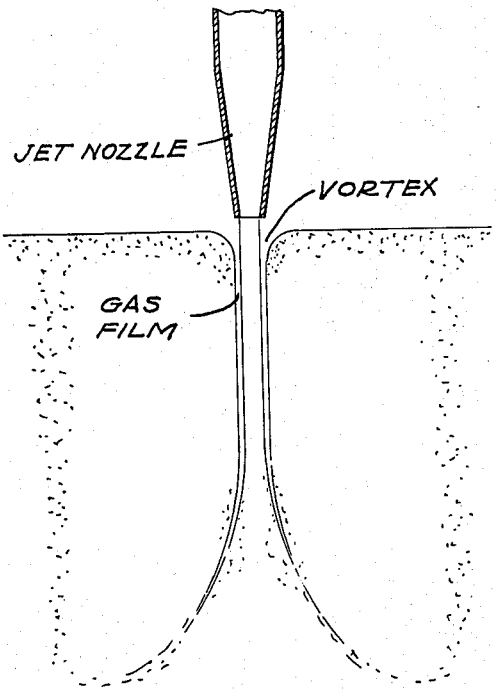
Fig. 3.

2,128,311

UNITED STATES PATENT OFFICE 2,128,311

METHOD OF CARRYING OUT CHEMICAL REACTIONS

Albert T. Mertes, Newport, Del., assignor, by mesne assignments, to E. I. du Pont de Nemours & Company, a corporation of Delaware Application April 20, 1935, Serial No. 17,417

5 Claims. (Cl. 23—1)

The present invention is directed to chemical processes in which a constituent of a gas is caused to react with a constituent of a liquid and is particularly concerned with the manner of bringing said gas into contact with said liquid.

In its specific embodiment my invention comprises forcing a liquid by means of a jet nozzle through a body of a gas whereby the film of gas intimately surrounding the solid liquid jet has imparted to it a high inertia by virtue of the same velocity as the liquid jet and is carried and driven with the liquid jet into the body of the liquid. The high inertia gas film is sheared from the jet after introduction within the body of said liquid and the gas bubbles dispersed through said body of liquid before being released.

In one of the preferred embodiments of my invention I cause both the liquid and the gas to move in a cycle until the desired reaction is completed.

Attached Fig. 1 is a schematical representation of an apparatus in which I can perform my novel process, particularly when atmospheric air is used.

Fig. 2 is a slightly modified type of apparatus, useful particularly when both the gas and liquid are re-cycled so as to obtain most complete chemical reaction.

Fig. 3 is a detailed view of the stream of liquid impinging upon the surface of the liquid to be treated.

1 in these figures is a container comprising a body of liquid 2, above which is a body of a gas 3. #4 is a pump which forces said liquid 2 through a conduit 5 into a jet 6 from which it emerges as a fast moving stream into the body of the gas 3, forming thereby a film of gas around the liquid jet which, due to their velocity, enter into the body of the liquid 2 where the gas is released and has an opportunity to react.

The apparatus of Fig. 1 is in direct contact with the atmosphere so that the gas is constantly renewed.

The apparatus of Fig. 2 is closed so as to obtain a continuous re-circulation of the unreacted gas. Additional gas as required is admitted through pipe 7 and valve 8 connected with a supply of the reaction gas. The apparatus of Fig. 2 can be put under any desired pressure.

In this type of apparatus the liquid jet acts as an aspirator for the gas to be introduced into the liquor. In Fig. 2 the film of gas on the liquid jet is introduced into the body of the liquid so that the gas is liberated after the jet has passed through a substantial mass of the liquid.

This type of apparatus and manner of operating is particularly suited when an undiluted gas is intended to be brought into contact with a liquid with which it is to react and permits complete utilization of the gas with cyclic circulation of the liquid and the gas.

Figure 3 shows the nozzle close to the surface of the liquid to be treated. It shows the vortex formed around the compact liquid jet as it impinges upon the liquid surface and the film of gas surrounding it, which gas is entrained into the body of the liquid and is gradually released as the introduced liquid loses its velocity and distributes itself throughout the body of the liquid.

My novel method of carrying out chemical reactions is particularly applicable to the oxidation of ferrous iron in solutions of heavy metal salts, an operation which is carried out in many metallurgical processes.

In the production of zinc liquor for the manufacture of lithopone or electrolytic zinc, ferrous iron is usually present in the solution and this is removed by oxidation of the iron with chemicals or by oxygen of the air, the iron being precipitated as ferric hydroxide, hydrated ferric oxide, or basic ferric salts.

For large scale production or when relatively large amounts of iron are to be oxidized, one usually prefers oxidation with atmospheric air because it is cheaper and because the oxidation chemicals ordinarily used introduce soluble impurities into the zinc liquor which are objectionable.

The usual method of aerial oxidation for iron removal consists in bubbling or blowing air into the liquor and distributing the air through perforated pipes, porous tile, canvas bags, distributing agitators, or Pachuca tanks where a single air jet is used in a central well. These devices require the use of considerable air under pressure and have the objection of being slow acting. At the same time this large amount of air blown into the solution has a strong cooling effect so that considerable heat in the form of steam must be added to maintain proper temperature to promote oxidation.

The use of large amounts of compressed air and maintenance of proper temperature are two factors which favor air oxidation but they oppose each other in respect to their operations. The excess air escaping from the tank at elevated temperature is saturated with water vapor and the heat absorbed to evaporate the water carried off in this manner is many times that required to heat the air so that only slight economy can be obtained by the use of heated air. By reducing the flow of air, less heat will be lost, but the oxidation rate is reduced so that an excessive time is required to oxidize the iron in solution.

In my present invention I can readily re-circulate at least part of the air whereby I maintain a temperature balance and only such amounts of new air are introduced as correspond to the oxygen consumed and only corresponding amounts of residual air carrying off steam are allowed to escape.

The following is a description of how I operated my novel process in connection with the purification of zinc liquor containing small amounts of ferrous iron.

I used a suitable tank of 15' diameter and 12' high whose capacity is approximately 2000 cu. ft. or 15,000 gal. Connected to this tank near the bottom by suitable piping is a centrifugal pump rated at 600 gal. per min. at 35 lbs. gauge pressure. The discharge line from this pump passes over the top of the tank. Two jet nozzles having a 1⅜" orifice are connected so as to discharge on diametrically opposite sides at half radius. The nozzle tips extend 6" below the tank top.

The tank was filled with liquor to be treated to about 4" from the nozzle tips. The circulatory pump was started and more liquor was added when the liquor level is more than 1" below the nozzle tips. Usually the aeration raises the liquor level 3" from the original liquid surface. I found that this distance gave a satisfactory oxidation rate with low heat loss. For most successful performance, the jet nozzle should deliver the liquid at less than 3" from the surface of the body of the liquid. For the removal of 1.0 to 2.0 grams ferrous iron per liter I found that 3 hours' aeration will reduce the iron to 0.05 gram per liter or less and that the temperature drop will average about 1° F. per hour when the initial liquor temperature was 150°–170° F. During aeration the liquor sulfate was neutralized to maintain the basicity of 0.1 to 0.6 gram per liter ZnO or to a pH of 4.0 to 6.0 For the removal of 4 to 5 grams per liter Fe, I have found that about 4 hours' aeration time is required. The oxidation rate is fairly constant until the iron has been reduced below 0.5 gram per liter or 85% of the original, from which point on the rate is increasingly slow.

When the nozzle is brought closer to the liquid level the force of the jet depresses the liquor around the jet so that less air is drawn into the vortex but is dispersed under the surface as extremely fine bubbles. The time of retention of bubbles in the liquor is usually about ½ minute but may be more as the nozzles are closer to the liquor or less as they are farther from the surface. The control of bubble size is readily obtained. The air efficiency based on oxygen analysis of spent air escaping from the liquor surface has been found to be over 30% when the iron content of the liquor is between 0.5 and 0.8 gram per liter As the iron content approaches zero the air efficiency, of course, becomes less.

The high efficiency of the jet nozzle aeration is not due entirely to the extremely fine bubbles produced but is also due to the violent agitation or shearing action of the jet against the liquor, destroying the gas film between the two. Close observation of the nature of the vortex produced where the jet enters the liquor shows an air space about 1/16" around the solid jet. This air space or film extends some distance below the surface and is in some respects an ejector or aspirator made from liquid. A strong suction of air is produced near the jet as a match is quickly extinguished when held near the vortex; the flame being drawn into the vortex. In this manner a combination of air and liquid is forced into the body of said liquid, so that the air is released in said liquid and will have to travel through a substantial body of said liquid before escaping into the atmosphere.

I have further found that liquid pressures of from for instance 30 to 60 lbs. in the jet are satisfactory for most purposes. With lower pressures the formation of gas bubbles and turbulence created is considerably less than with higher pressures; while oxidation is accelerated with higher pressures the increase in power consumption may not be economical.

For practical purposes I found that the liquid stream emerging from the jet nozzle at a velocity which exceeds 40 feet per second is best adapted for economically carrying out my novel method.

I also found that the violent agitation produced in the liquor by the jets increases the efficiency of the materials used for neutralizing and that the precipitated iron is in a form more suited for filtration and washing. When iron is removed by chemicals and by the usual method of air oxidation, a considerable zinc loss accompanies the removal of iron because in most cases the iron is precipitated as slimy ferric hydroxide and causes absorption of zinc solution in the precipitate and the insolubles.

The efficiency of my novel jet nozzle method was compared with other methods of air oxidation and the following results obtained.

*Simple bubbling*

A wooden tank 3' diameter and 3' high was filled with about 125 gal. 40° Bé. zinc sulfate liquor containing about 4 grams per liter Fe. Air was introduced at the bottom by means of a lead coil having six equally spaced holes. Air was bubbled through the liquor at a rate of 4 to 5 cu. ft. per minute. An average oxidation rate of 0.24 gram per liter Fe per hour was obtained over a period of six hours. The calculated air efficiency was 0.6% at a liquor temperature of 40 to 60° C.

*Spray nozzle*

Under spray nozzle methods I understand a liquid distribution system where a liquid is sprayed through gas over a liquor forming droplets which simply mix with the liquor without entraining any substantial amounts of gas into the body of the liquor.

Using the above tank and quantity of zinc liquor and pumping from the tank at a rate of 8 gal. per minute through a spray nozzle so that fine droplets of liquor descended through about 3' or air, an average oxidation rate of 0.12 gram per liter Fe per hour was obtained for a period of 3 hours.

*Jet nozzle*

Using the same pump and equipment except that a single smooth jet nozzle located about 1" from the surface of the liquid was used to drive air into the liquor an oxidation rate of 0.48 gram per liter Fe per hour was obtained. The pumping rate was 10 gal. per minute.

My invention is not limited to the treatment of heavy metal salt solutions containing small amounts of ferrous salt, but is applicable to other cases involving chemical reactions between a gas and a liquid constituent or a gas and a solid suspended in a liquid, or where a reaction between a gas and a liquid is carried out in the presence of a solid catalyst suspended in said liquid. The last type of reaction is, for instance, represented by the hydrogenation of liquid fats and oils in the presence of a finely divided nickel catalyst.

My method of carrying out chemical reactions by forming a gas film on a liquid and injecting this combination into the body of the liquid shows its greatest advantages where the gas is only very slightly soluble in the liquid and where the active reacting constituents of both the gas and the liquid are diluted.

The advantages in such cases result mainly from the forceful introduction of the gas high inertia film, from the very fine distribution of small gas bubbles throughout the liquid as obtained by my novel method, the prolonged time of retention of the bubbles of the gas, and the violent agitation obtained in the body of the liquid by the forceful introduction thereinto of the liquid jet, features which are not obtainable by other methods of introducing a gas into a liquid.

I claim:

1. In a process of oxidizing a ferrous compound dissolved in a solution of a heavy metal salt, the step of circulating said solution through a jet nozzle delivering said liquid at less than 3 inches from the surface of the body of said liquid at a velocity of at least 40 ft. per second, whereby said liquid is delivered through atmospheric air into the body of said liquid.

2. The process of claim 1 when applied to a solution of a zinc salt containing a small amount of a ferrous salt, the solution being maintained at a pH of 4 to 6.

3. A process for oxidizing a ferrous compound, contained in a solution of a heavy metal salt by means of atmospheric air, comprising controlling the bubble size and distribution of said air within a body of said solution by circulating the heavy metal salt solution through an atmosphere of air and into a body of said solution from a nozzle discharging at a jet velocity of at least 40 feet per second and maintained at a point approximately less than 3 inches from the surface of the body of said heavy metal salt solution.

4. The process of claim 3 when applied to a solution of a zinc salt containing a small amount of a ferrous salt, the solution being maintained at a pH of 4 to 6.

5. A process for oxidizing a ferrous compound contained in a solution of a zinc salt which comprises confining said constituents within a closed reaction zone in which a body of liquid reactant is maintained in contact with an atmosphere of gaseous reactant, maintaining an enforced, cyclic circulation of said liquid reactant through and in direct contact with said gaseous reactant and so controlling the circulation of said liquid as to discharge the same in a stream at a velocity of at least 40 ft. per second from a jet positioned approximately less than 3 inches from the surface of said liquid, so as to film said liquid with said gas and deliver the resultant combination into the body of said liquid.

ALBERT T. MERTES.